(12) United States Patent
Tachi (10) Patent No.: US 11,922,916 B2
(45) Date of Patent: Mar. 5, 2024

(54) ACTIVE NOISE CONTROL SYSTEM

(71) Applicant: Alps Alpine Co., LTD, Tokyo (JP)

(72) Inventor: Ryosuke Tachi, Fukushima (JP)

(73) Assignee: Alps Alpine Co., LTD., Tokyo (JP)

( * ) Notice: Subject to any disclaimer, the term of this patent is extended or adjusted under 35 U.S.C. 154(b) by 130 days.

(21) Appl. No.: 17/689,294

(22) Filed: Mar. 8, 2022

(65) Prior Publication Data

US 2022/0293079 A1 Sep. 15, 2022

(30) Foreign Application Priority Data

Mar. 10, 2021 (JP) .................................. 2021-038392

(51) Int. Cl.
| | |
|---|---|
| *G10K 11/178* | (2006.01) |
| *G10L 21/0208* | (2013.01) |
| *G10L 25/84* | (2013.01) |
| *H04R 1/40* | (2006.01) |
| *H04R 3/00* | (2006.01) |

(52) U.S. Cl.
CPC .. *G10K 11/17817* (2018.01); *G10K 11/17854* (2018.01); *G10K 11/17857* (2018.01); *G10L 21/0208* (2013.01); *G10L 25/84* (2013.01); *H04R 1/406* (2013.01); *H04R 3/005* (2013.01); *G10L 2021/02082* (2013.01); *H04R 2499/13* (2013.01)

(58) Field of Classification Search
CPC ....... G10K 11/17817; G10K 11/17857; G10K 11/17854; G10L 21/0208; G10L 25/84; G10L 2021/02082; H04R 1/406; H04R 3/005; H04R 2499/13

USPC .......................................................... 381/86
See application file for complete search history.

(56) References Cited

U.S. PATENT DOCUMENTS

| | | | | |
|---|---|---|---|---|
| 5,706,344 A | * | 1/1998 | Finn ...................... | H04M 9/082 381/94.1 |
| 6,674,865 B1 | * | 1/2004 | Venkatesh ................ | H04R 3/02 381/86 |

(Continued)

FOREIGN PATENT DOCUMENTS

| | | |
|---|---|---|
| EP | 3 346 466 A1 | 7/2018 |
| JP | 2010-016564 | 1/2010 |
| JP | 2010-163054 | 7/2010 |

OTHER PUBLICATIONS

European Search Report from corresponding European application No. 22159722.2, dated Jul. 20, 2022, 7 pp.

*Primary Examiner* — Jason R Kurr
*Assistant Examiner* — Douglas J Suthers
(74) *Attorney, Agent, or Firm* — Crowell & Moring LLP (57) ABSTRACT

A signal e(z) obtained by subtracting echo-canceling sound from an output of a second microphone is used as an error of an echo cancellation adaptive filter and a noise cancellation adaptive filter, and an output of a first sound source device is added to the signal e(z) and output from a first speaker. The echo cancellation adaptive filter generates echo-canceling sound from an addition signal of the output of the second sound source device and the output of the first microphone such that the signal e(z) is minimized. The noise cancellation adaptive filter generates the noise-canceling sound from the output of the first sound source device such that the signal e(z) is minimized, and outputs the noise-canceling sound from the second speaker.

12 Claims, 4 Drawing Sheets

(56) References Cited

U.S. PATENT DOCUMENTS

2018/0012589 A1* 1/2018 MacNeille ....... G10K 11/17821
2020/0020315 A1* 1/2020 Tachi ............... G10K 11/17854

* cited by examiner

ACTIVE NOISE CONTROL SYSTEM

RELATED APPLICATION

The present application claims priority to Japanese Patent Application Number 2021-038392, filed Mar. 10, 2021 the entirety of which is hereby incorporated by reference.

BACKGROUND

1. Field of the Invention

The present invention relates to an active noise control (ANC) technology that reduces noise by emitting noise-canceling sound to cancel out noise.

2. Description of the Related Art

Figure 3:
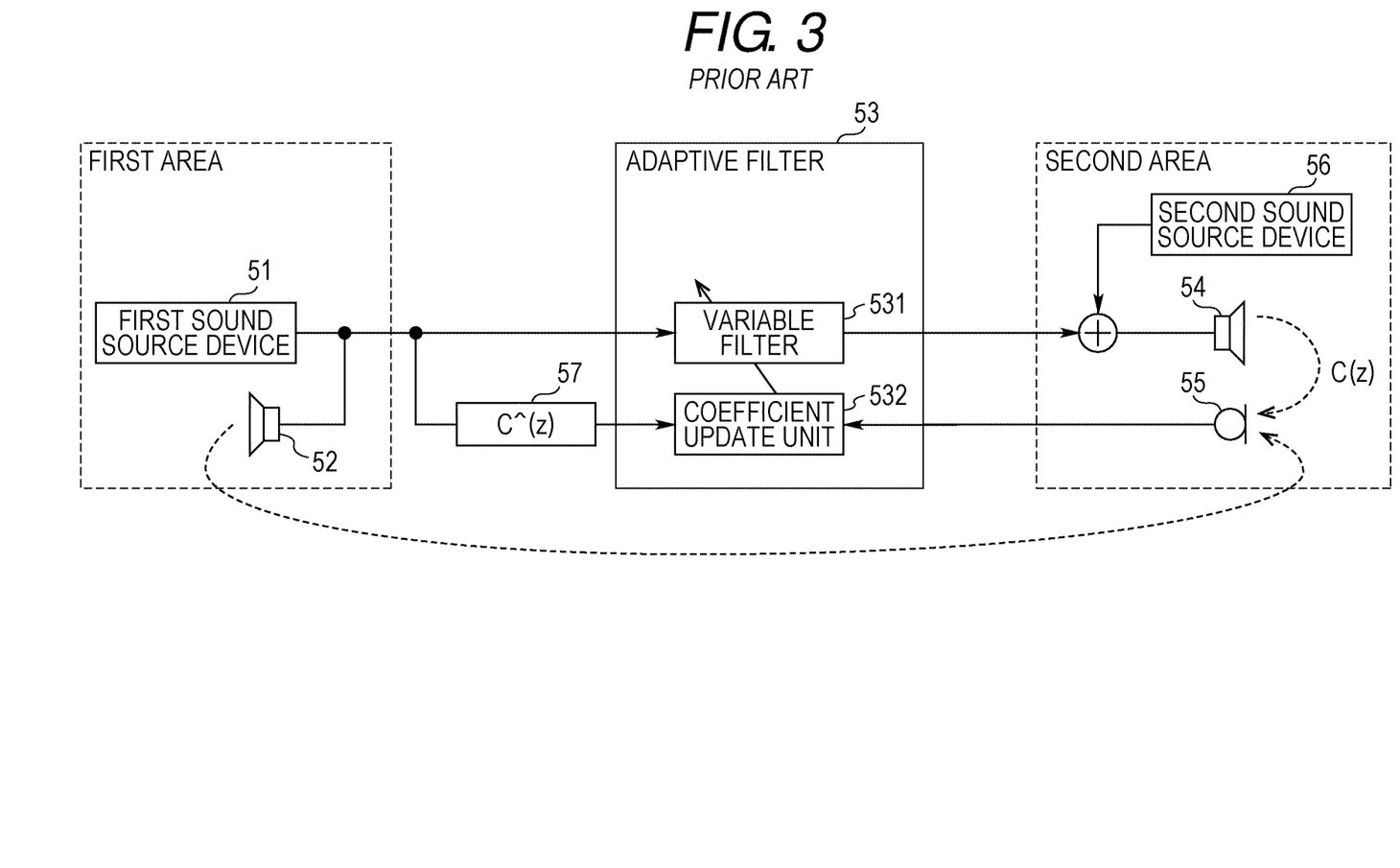
FIG. 3 is a diagram illustrating the configuration of a known active noise control system.

As a technique of active noise control, as in an active noise control system illustrated in FIG. 3, there is known a technique in which a noise-canceling sound generated using an adaptive filter 53 as noise for the user in the second area using a sound such as music output from a first sound source device 51 that is a sound source device for the user in a first area to a speaker 52 for the user in the first area is added to an output of a second sound source device 56 that is a sound source device for the user in a second area and is output from the speaker 54 in the second area (for example, JP 2010-163054 A).

In this active noise control system, an error microphone 55 disposed in the second area and a secondary path reproduction filter 57 in which a transfer function $\hat{C}(z)$ estimated as a transfer function $C(z)$ from the speaker 54 to the error microphone 55 in the second area is set as a transfer function and the output of the first sound source device 51 is used as an input are used. In the adaptive filter 53, a coefficient updating unit 532 updates the filter coefficient of a variable filter 531 that generates the noise-canceling sound from the output of the first sound source device 51 so as to minimize the error by the Filtered-X LMS algorithm that performs the LMS algorithm using the output of the error microphone 55 as an error and the output of the secondary path reproduction filter 57 as a reference signal.

Figure 4:
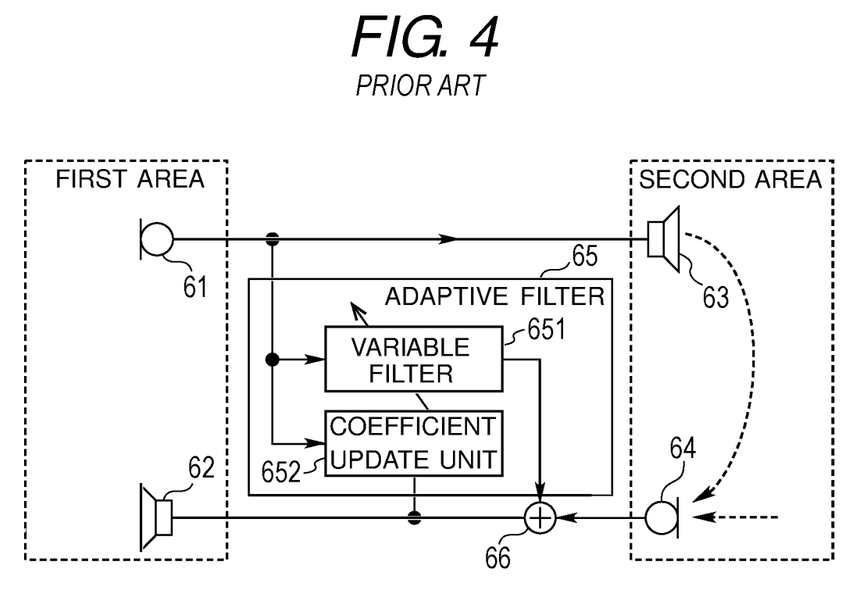
FIG. 4 is a diagram illustrating the configuration of a known echo cancellation system.

In addition, as illustrated in FIG. 4, there is also known an echo cancellation system in which a cancellation sound for canceling an echo is generated using an adaptive filter 65, and an adder 66 adds the cancellation sound to an output of a microphone 64 in a second area to cancel an echo going around from a speaker 63 in the second area into the microphone 64 in the second area in a system that supports conversation between a user in the first area and a user in the second area by outputting a user's voice picked up by a microphone 61 in the first area from the speaker 63 in the second area and outputting a user's voice picked up by the microphone 64 in the second area from a speaker 62 in the first area (for example, JP 2010-16564 A).

In the echo cancellation system, in the adaptive filter 65, a coefficient updater 652 updates the filter coefficient of a variable filter 651 that generates a cancellation sound from the output of the microphone 61 in the first area such that the error is minimized by the LMS algorithm or the like using the output of the adder 66 as an error and the output of the microphone 61 in the first area as a reference signal.

According to the active noise control system illustrated in FIG. 3, the output sound of the second sound source device 56 output from the speaker 54 in the second area is picked up by the error microphone 55, input to the adaptive filter 53 together with the noise remaining after cancellation, and processed as an error. However, since the output sound of the second sound source device 56 is not a noise component to be canceled, the output sound becomes a disturbance that hinders generation of an appropriate noise-canceling sound for the adaptive filter 53.

SUMMARY

Therefore, an object of the present disclosure is to satisfactorily cancel noise even when an output sound of a sound source device is input to a microphone that detects noise.

In order to achieve the above object, the present disclosure provides an active noise control system for reducing noise, the active noise control system including: a first area microphone that is a microphone disposed in a first area; a second area speaker that is a speaker that outputs sound to a second area; a second area microphone that is a microphone disposed in the second area; a second area sound source device that is a sound source device that outputs a sound output from the second area speaker; a first adder that adds an output of the first area microphone and an output of the second area sound source device; an echo cancellation adaptive filter that receives an output of the first adder as an input; a second adder that adds an output of the second area microphone and an output of the echo cancellation adaptive filter; a noise cancellation adaptive filter that receives a noise signal representing noise for the user in the second area as an input; and a third adder that outputs a signal obtained by adding the output of the first area microphone, the output of the second area sound source device, and the output of the noise cancellation adaptive filter to the second area speaker. Here, the echo cancellation adaptive filter updates a filter coefficient such that an output of the second adder is regarded as an error and the error is minimized, and the noise cancellation adaptive filter updates a filter coefficient such that the output of the second adder is regarded as an error and the error is minimized.

Here, such an active noise control system may include a secondary path reproduction filter that receives the noise signal as an input, in which a transfer function from the second speaker to the first microphone is set in advance, and the noise cancellation adaptive filter may update the filter coefficient by a Filtered-X LMS algorithm in which an output of the second adder is regarded as an error and an output of the secondary path reproduction filter is regarded as a reference signal.

In the above active noise control system, in the echo cancellation adaptive filter, the filter coefficient may be updated by an LMS algorithm in which an output of the first adder is regarded as a reference signal and an output of the second adder is regarded as an error.

The active noise control system may further include a first area speaker that is a speaker that outputs sound to the first area, to which the output of the second adder is input.

Alternatively, the active noise control system may include a first area speaker that outputs sound to the first area; and a first area sound source device that is a sound source device that outputs a sound output from the first area speaker, and the noise signal may be an output of the first area sound source device.

Alternatively, the active noise control system may include a first area speaker that outputs sound to the first area; a first area sound source device that is a sound source device that outputs a sound output from the first area speaker; and a fourth adder that adds the output of the first area sound source device to the output of the second adder and outputs the addition result to the first area speaker, and the noise signal may be an output of the first area sound source device.

The above active noise control system may be a system mounted in an automobile, and the first area and the second area may be different areas in a cabin of the automobile.

According to the active noise control system as described above, the output of the second adder is obtained by excluding the echo of the output of the first area microphone and the output sound of the second area sound source device from the output of the second area microphone. Therefore, since the noise cancellation adaptive filter updates the filter coefficient so that the error is minimized using the output of the second adder as the error, it is possible to satisfactorily cancel noise by eliminating the influence of disturbance such as the echo of the output of the first area microphone and the output sound of the second area sound source device.

Furthermore, in a case where the first area speaker, which is a speaker that outputs sound to the first area, to which the output of the second adder is input, is provided to assist listening of the user in the first area, of the speech of the user in the second area, the elimination of the influence of such disturbance can be realized with a simple configuration using the echo cancellation adaptive filter that cancels the echo of the output of the first area microphone that is output to the first area speaker.

As described above, according to the present disclosure, it is possible to satisfactorily cancel noise even when an output sound of a sound source device is input to a microphone that detects noise.

DETAILED DESCRIPTION

Hereinafter, an example in which an embodiment of the present invention is applied to an in-vehicle system mounted in a vehicle will be described.

Figure 1A:
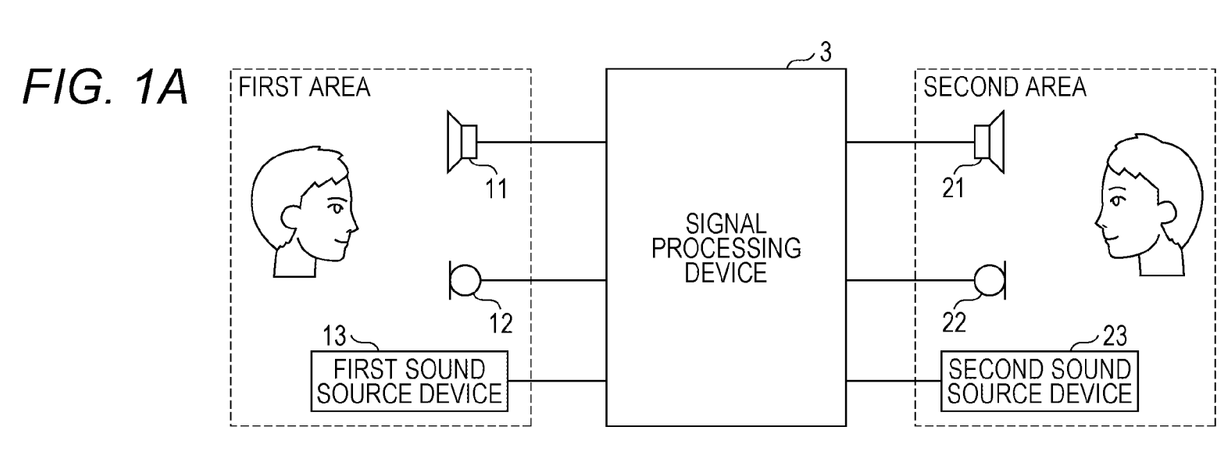
FIGS. 1A to 1B are block diagrams illustrating the configuration of an in-vehicle system according to an embodiment of the present invention.

FIG. 1A illustrates the configuration of an in-vehicle system according to the present embodiment.

As illustrated, the in-vehicle system includes a signal processing device 3 to which the following units are connected: a first speaker 11 that is a speaker for the user in a first area in the cabin; a first microphone 12 that is a microphone for the user in the first area; a first sound source device 13 that is a sound source device for the user in the first area and outputs a sound such as music; a second speaker 21 that is a speaker for the user in a second area in the cabin; a second microphone 22 that is a microphone for the user in the second area; and a second sound source device 23 that is a sound source device for the user in the second area and outputs a sound such as music.

The signal processing device 3 supports the communication by conversation between the user in the first area and the user in the second area by outputting the voice of the user in the first area picked up by the first microphone 12 in the first area to the second speaker 21 in the second area, and outputting the voice of the user in the second area picked up by the second microphone 22 in the second area to the first speaker 11 in the first area after canceling an echo of the voice of the user in the first area going around from the second speaker 21 into the second microphone 22 and the output sound of the second sound source device 23 picked up by the second microphone 22.

In addition, the signal processing device 3 outputs the output sound of the first sound source device 13 to the first speaker 11 in the first area, and outputs the output sound of the second sound source device 23 to the second speaker 21 in the second area.

In addition, the signal processing device 3 prevents the user in the second area from being bothered by the output sound of the first sound source device 13 that the user in the first area is listening to by outputting, from the second speaker 21 in the second area, a noise-canceling sound that cancels the output sound of the first sound source device 13 output from the first speaker 11, as the noise of the user in the second area, at the position of the user in the second area.

Figure 1B:
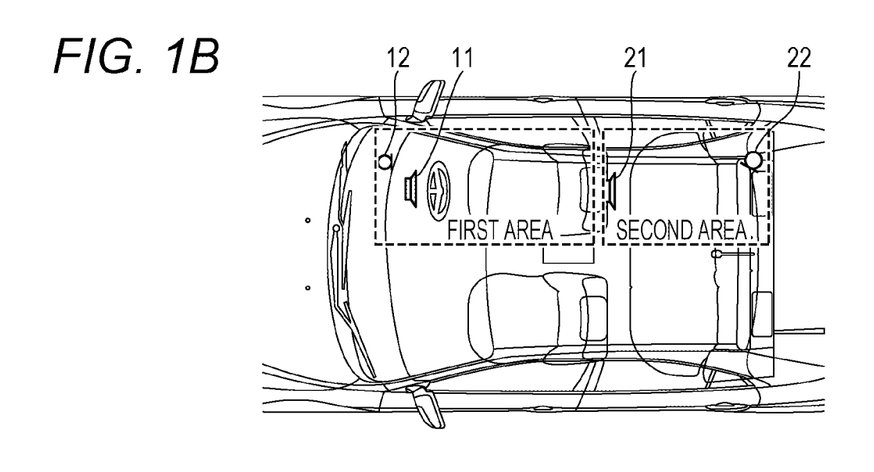

Here, for example, as illustrated in FIG. 1B, the first area is an area of a driver's seat of an automobile, and the first speaker 11 and the first microphone 12 are disposed in the first area. The second area is an area of a seat behind the driver's seat of an automobile, and the second speaker 21 and the second microphone 22 are disposed in the second area.

Figure 2:
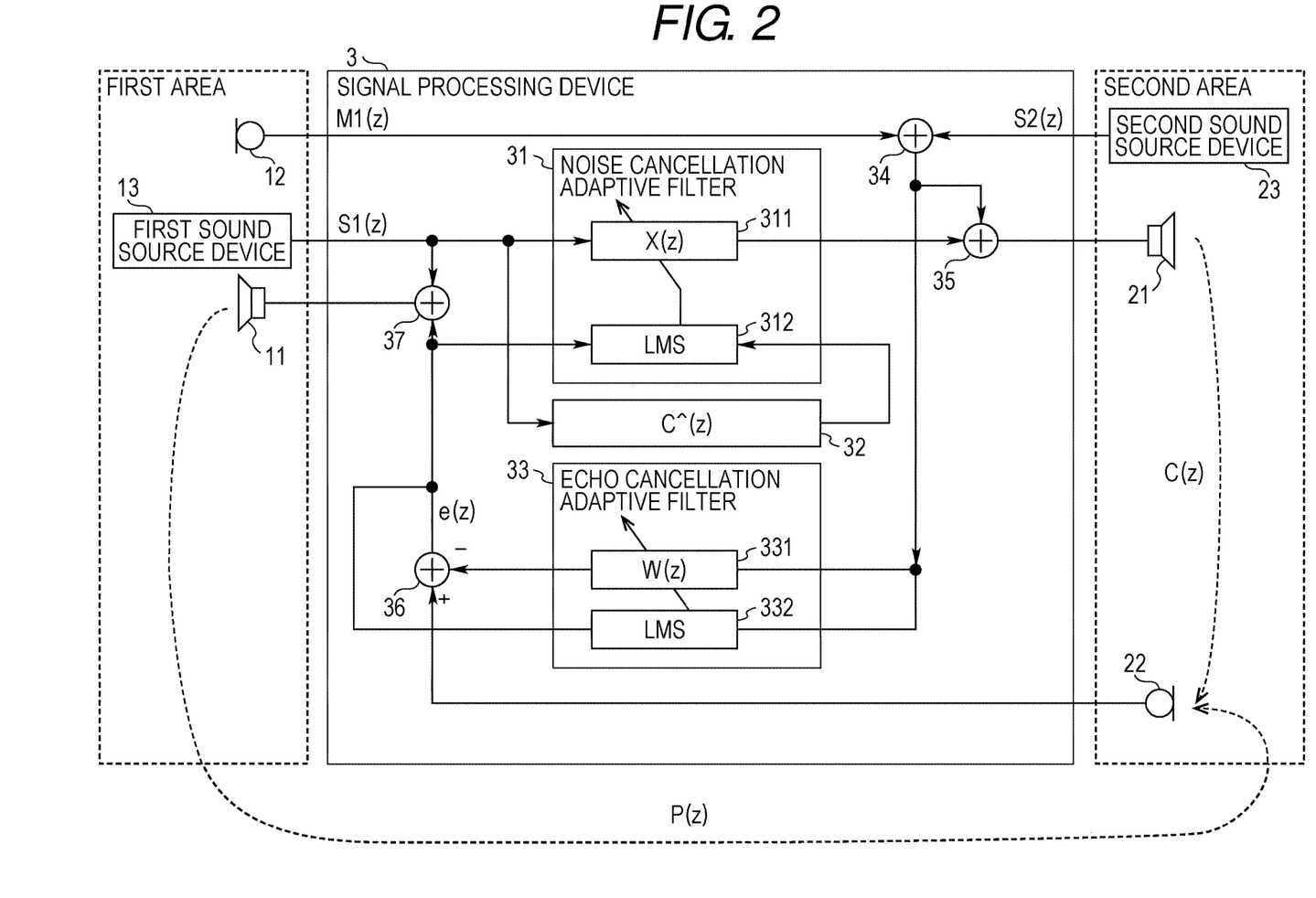
FIG. 2 is a block diagram illustrating the configuration of a signal processing device according to an embodiment of the present invention.

Next, FIG. 2 illustrates the configuration of the signal processing device 3.

As illustrated, the signal processing device 3 includes a noise cancellation adaptive filter 31, a secondary path reproduction filter 32, an echo cancellation adaptive filter 33, a first adder 34, a second adder 35, a third adder 36, and a fourth adder 37.

The output of the first microphone 12 is sent to the first adder 34, and is added to the output of the second sound source device 23 by the first adder 34. The second adder 35 further adds the noise-canceling sound output from the noise cancellation adaptive filter 31 to the addition signal of the output of the first microphone 12 and the output of the second sound source device 23 output from the first adder 34, and outputs the addition result from the second speaker 21.

The output of the second microphone 22 is sent to the third adder 36, the echo-canceling sound output from the echo cancellation adaptive filter 33 is subtracted by the third adder 36 and then sent to the fourth adder 37, and the fourth adder 37 adds the output of the first sound source device 13 to the output of the third adder 36 and outputs the addition result to the first speaker 11.

The echo cancellation adaptive filter 33 includes an echo cancellation variable filter 331 and an echo cancellation coefficient updating unit 332.

The echo cancellation variable filter 331 receives the addition signal of the output of the first microphone 12 and the output of the second sound source device 23 output from the first adder 34 as an input, and the output of the echo cancellation variable filter 331 is output to the third adder 36 as an echo-canceling sound.

The echo cancellation coefficient updating unit 332 updates the filter coefficient of the echo cancellation variable filter 331 so that the error is minimized by the LMS algorithm or the like using the output of the third adder 36 as an error and the addition signal of the output of the first microphone 12 and the output of the second sound source device 23 output from the first adder 34 as a reference signal.

Next, a transfer function $\hat{C}(z)$ estimated as the transfer function C(z) from the second speaker 21 to the second microphone 22 is set in advance as the transfer function in the secondary path reproduction filter 32. The secondary path reproduction filter 32 receives the output of the first sound source device 13 as an input, and the output of the secondary path reproduction filter 32 is output to the noise cancellation adaptive filter 31 as a reference signal.

The noise cancellation adaptive filter 31 includes a noise cancellation variable filter 311 and a noise cancellation coefficient updating unit 312.

The noise cancellation variable filter 311 receives the output of the first sound source device 13 as an input, and the output thereof is output to the second adder 35 as a noise-canceling sound.

The noise cancellation coefficient updating unit 312 receives the output of the third adder 36 as an error and receives the output of the secondary path reproduction filter 32 as a reference signal.

The noise cancellation coefficient updating unit 312 updates the filter coefficient of the noise cancellation variable filter 311 according to the Filtered-X LMS algorithm by performing the LMS algorithm so as to minimize the error input from the third adder 36 using the reference signal input from the secondary path reproduction filter 32.

More specifically, the echo cancellation coefficient updating unit 332 updates the filter coefficient x(n) of the noise cancellation variable filter 311 according to the following equation of the Filtered-X LMS algorithm, x(n+1)=x(n)+μe(n) r(n), where x(n) is the filter coefficient of the noise cancellation variable filter 311, μ is the step size parameter, e(n) is the error input from the third adder 36, and r(n) is the reference signal (filtering reference signal) input from the secondary path reproduction filter 32.

In the configuration as described above, when W(z) is the transfer function of the echo cancellation variable filter 331, X(z) is the transfer function of the noise cancellation variable filter 311, P(z) is the transfer function from the first speaker 11 to the second microphone 22, C(z) is the transfer function from the second speaker 21 to the second microphone 22, S1(z) is the output of the first sound source device 13, S2(z) is the output of the second sound source device 23, and M1(z) is the output of the first microphone 12, and when the speech of the user in the second area is not picked up by the second microphone 22, the output e(z) of the third adder 36 used as an error by the echo cancellation coefficient updating unit 332 and the noise cancellation coefficient updating unit 312 is represented as follows:

$$e(z)=M1(z)C(z)+S2(z)C(z)+S1(z)P(z)-M1(z)W(z)-S2(z)W(z)-S1(z)X(z)C(z)=\{M1(z)+S2(z)\}C(z)-\{M1(z)+S2(z)\}W(z)+S1(z)\{P(z)-X(z)C(z)\}$$

wherein e(z)=0 when C(z)=W(z) and P(z)=X(z) C(z).

Therefore, by the operation of the echo cancellation coefficient updating unit 332, the transfer function W(z) of the echo cancellation variable filter 331 is set to be equal to the transfer function C(z) from the second speaker 21 to the second microphone 22.

The echo-canceling sound that the echo cancellation variable filter 331 generates and outputs by the transfer function W(z) from the addition signal of the output of the first microphone 12 and the output of the second sound source device 23 is a sound that cancels the echo of the output of the first microphone 12 and the output sound of the second sound source device 23, which are output from the second speaker 21 and picked up by the second microphone 22, from the output of the second microphone 22 by subtraction of the third adder 36.

Accordingly, the transfer function X(z) of the noise cancellation variable filter 311 is set by the operation of the noise cancellation coefficient updating unit 312 such that the transfer function X(z)C(z) from the input of the noise cancellation variable filter 311 to the second microphone 22 is equal to the transfer function P(z) from the first speaker 11 to the second microphone 22.

Then, the noise-canceling sound that the noise cancellation variable filter 311 generates the transfer function X(z) from the output of the first sound source device 13 and outputs from the second speaker 21 cancels the output sound of the first sound source device 13 output from the first speaker 11 in the region where the second microphone 22 is disposed.

The output e(z) of the third adder 36 input as an error to the noise cancellation coefficient updating unit 312 is obtained by excluding an echo of the output of the first microphone 12 and the output sound of the second sound source device 23 from the output of the second microphone 22.

Therefore, for example, when the speech of the user in the second area is not picked up by the second microphone 22, the output e(z) of the third adder 36 becomes S1(z) {P(z)-X(z) C(z)}, and represents only the noise (the output sound of the first sound source device 13) that remains after being canceled by the noise-canceling sound.

Therefore, according to the present embodiment, the noise cancellation adaptive filter 31 can satisfactorily cancel the output sound of the first sound source device 13 by eliminating the influence of disturbance such as the echo of the output of the first microphone 12 and the output sound of the second sound source device 23.

Furthermore, the elimination of the influence of such disturbance can be realized with a simple configuration using the echo cancellation adaptive filter 33 that cancels the echo of the output of the first microphone 12 that is output to the first speaker 11.

By the way, in each of the above embodiments, the configuration of canceling the echo going around from the second speaker 21 of the signal processing device 3 into the second microphone 22 and the configuration of being symmetric with respect to the first area and the second area may be added to the signal processing device 3, so that the voice picked up by the first microphone 12 in the first area may be output to the second speaker 21 after canceling the echo going around from the first speaker 11 into the first microphone 12.

In addition, the configuration in which the noise-canceling sound for canceling the output sound of the first sound source device 13 output from the first speaker 11 of the signal processing device 3 described above at the position of the user in the second area is output from the second speaker 21 and the configuration being symmetric with respect to the first area and the second area may be added to the signal processing device 3, so that the noise-canceling sound for canceling the output sound of the second sound source device 23 output from the second speaker 21 at the position of the user in the first area is output from the first speaker 11.

In each of the above embodiments, the number of areas is two, but the present embodiment may be expanded to correspond to three or more areas.

Furthermore, although the application to the in-vehicle system has been described above as an example, each of the above embodiments can be similarly applied to a case where the areas are outside the automobile.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An active noise control system for reducing noise, the active noise control system comprising:
   a first area microphone that is a microphone disposed in a first area;
   a second area speaker that is a speaker that outputs sound to a second area;
   a second area microphone that is a microphone disposed in the second area;
   a second area sound source device that outputs a sound output from the second area speaker;
   a first adder that adds an output of the first area microphone and an output of the second area sound source device;
   an echo cancellation adaptive filter that receives an output of the first adder as an input;
   a second adder that adds an output of the second area microphone and an output of the echo cancellation adaptive filter;
   a noise cancellation adaptive filter that receives a noise signal representing noise for a user in the second area as an input; and
   a third adder that outputs a signal obtained by adding the output of the first area microphone, the output of the second area sound source device, and the output of the noise cancellation adaptive filter to the second area speaker, wherein
   the echo cancellation adaptive filter updates a filter coefficient such that an output of the second adder is regarded as an error and the error is minimized, and
   the noise cancellation adaptive filter updates a filter coefficient such that the output of the second adder is regarded as an error and the error is minimized.

2. The active noise control system according to claim 1, further comprising:
   a secondary path reproduction filter that receives the noise signal as an input, in which a transfer function from the second speaker to the first microphone is set in advance, wherein
   the noise cancellation adaptive filter updates the filter coefficient by a Filtered-X least means squared (LMS) algorithm in which an output of the second adder is regarded as an error and an output of the secondary path reproduction filter is regarded as a reference signal.

3. The active noise control system according to claim 2, wherein
   the echo cancellation adaptive filter updates the filter coefficient by an LMS algorithm in which an output of the first adder is regarded as a reference signal and an output of the second adder is regarded as an error.

4. The active noise control system according to claim 3, further comprising:
   a first area speaker that is a speaker that outputs sound to the first area, to which the output of the second adder is input.

5. The active noise control system according to claim 3, further comprising:
   a first area speaker that outputs sound to the first area; and
   a first area sound source device that is a sound source device that outputs a sound output from the first area speaker, wherein
   the noise signal is an output of the first area sound source device.

6. The active noise control system according to claim 3, further comprising:
   a first area speaker that outputs sound to the first area;
   a first area sound source device that is a sound source device that outputs a sound output from the first area speaker; and
   a fourth adder that adds the output of the first area sound source device to the output of the second adder and outputs the addition result to the first area speaker, wherein
   the noise signal is an output of the first area sound source device.

7. The active noise control system according to claim 6, wherein
   the active noise control system is mounted in an automobile, and
   the first area and the second area are different areas in a cabin of the automobile.

8. The active noise control system according to claim 1, wherein
   the echo cancellation adaptive filter updates the filter coefficient by a least means squared (LMS) algorithm in which an output of the first adder is regarded as a reference signal and an output of the second adder is regarded as an error.

9. The active noise control system according to claim 8, further comprising:
   a first area speaker that is a speaker that outputs sound to the first area, to which the output of the second adder is input.

10. The active noise control system according to claim 8, further comprising:
    a first area speaker that outputs sound to the first area; and
    a first area sound source device that is a sound source device that outputs a sound output from the first area speaker, wherein
    the noise signal is an output of the first area sound source device.

11. The active noise control system according to claim 8, further comprising:
    a first area speaker that outputs sound to the first area;
    a first area sound source device that is a sound source device that outputs a sound output from the first area speaker; and
    a fourth adder that adds the output of the first area sound source device to the output of the second adder and outputs the addition result to the first area speaker, wherein
    the noise signal is an output of the first area sound source device.

12. The active noise control system according to claim 11, wherein
    the active noise control system is mounted in an automobile, and the first area and the second area are different areas in a cabin of the automobile.

\* \* \* \* \*